(12) United States Patent
Fama (10) Patent No.: US 8,873,732 B2
(45) Date of Patent: *Oct. 28, 2014

(54) SYSTEMS AND METHODS FOR SCHEDULING OF OUTBOUND AGENTS

(75) Inventor: Jason Fama, Redwood City, CA (US)

(73) Assignee: Verint Americas Inc., Melville, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/406,506

(22) Filed: Feb. 27, 2012

(65) Prior Publication Data

US 2012/0224679 A1   Sep. 6, 2012

Related U.S. Application Data (63) Continuation of application No. 11/393,286, filed on Mar. 30, 2006, now Pat. No. 8,126,134.

(51) Int. Cl.
*H04M 3/00* (2006.01)
*H04M 5/00* (2006.01)
*G06Q 10/10* (2012.01)

(52) U.S. Cl.
CPC ..................................... *G06Q 10/10* (2013.01)

USPC ............ 379/265.01; 379/265.05; 379/265.07; 379/265.08; 379/265.11; 379/266.07

(58) Field of Classification Search
USPC ......... 379/265.01, 32.02, 196, 266.1, 265.06, 379/265.02, 265.05, 265.11, 266.07, 379/266.08, 265.8, 265.07, 265.12, 265.13, 379/265.14

See application file for complete search history.

(56) References Cited

U.S. PATENT DOCUMENTS 5,822,400 A * 10/1998 Smith ..................... 379/32.02
8,155,293 B2 * 4/2012 Tiliks et al. .................. 379/196

* cited by examiner

*Primary Examiner* — Thjuan K Addy
(74) *Attorney, Agent, or Firm* — Andrus Intellectual Property Law, LLP (57) ABSTRACT

A system for scheduling outbound agents comprises an instruction execution system. The instruction execution system is configured to identify a workload comprising a plurality of outbound contacts. The instruction execution system is further configured to receive historical information comprising connection rates of past outgoing contact attempts. The instruction execution system is further configured to schedule the outbound contacts based at least on the connection rates of the past outgoing contact attempts.

20 Claims, 4 Drawing Sheets

SYSTEMS AND METHODS FOR SCHEDULING OF OUTBOUND AGENTS

RELATED APPLICATIONS

This application claims the benefit of the U.S. patent application entitled "SYSTEMS AND METHODS FOR SCHEDULING OF OUTBOUND AGENTS" having Ser. No. 11/393,286 filed on Mar. 30, 2006, now U.S. Pat. No. 8,126,134, all of which is entirely incorporated herein by reference.

TECHNICAL BACKGROUND

Generating schedules for employees is a complex problem for many enterprises. Such an enterprise is an outbound call center, in which scheduling of employees can be a complex task with a large number of variables. Variables include lists of numbers to call, available staff, skills of various staff members, call type (e.g., new order call and customer service call), and number of call queues, where a queue may be assigned a particular call type.

A basic goal of call center scheduling is to minimize the cost of agents that are staffed while maximizing quality of service. One common metric for call service level is the percentage of the lists that are contacted.

To complicate scheduling of agents further, not all agents have the same skills. Thus, some agents can handle some calls while other agents cannot. Scheduling for varying agent skill sets, therefore, is a skill-based scheduling problem. This skill-based scheduling problem is considerably more difficult than a basic call center scheduling problem because of all the interactions between calling queues.

Recently, call centers have evolved into "contact centers" in which the agent's contact with the customer can be through many contact media. For example, a contact center may handle incoming telephone, email, web callback, web chat, fax, and voice over Internet protocol (IP) communications. Therefore, in addition to variation in the types of calls (e.g., collections call, order call), modern contact centers have the complication of variation in contact media, which also adds complexity to the agent scheduling process.

In this regard, different types of calls are typically placed onto different queues. By way of example, outbound calls may be placed in an outbound call queue, while inbound calls may be placed in an inbound call queue. Such an inbound call queue typically is managed by an automatic call distributor (ACD), whereas an outbound call queue typically is managed by a predictive dialer. Notably, scheduling of agents for handling of calls, whether inbound or outbound, is based on various factors, such as call forecasts and goals. However, the forecasts and goals used for scheduling of agents for inbound calls are not the same as those used for scheduling of agents for outbound calls.

SUMMARY

In this regard, systems, methods and computer-readable media for scheduling outbound agents are provided. A representative embodiment of such a system comprises a user interface, scheduling software and a push forward discrete modeler. The scheduling software is operative to receive scheduling data, at least some of which is provided via the user interface, and to generate scheduling constraints. The scheduling data comprises historical call connect rates related to time intervals for which a schedule is to be generated and information corresponding to a desired service goal for the schedule. The desired service goal provides an indication of a level of service that is to be provided by the schedule. The search engine is operative to use the scheduling constraints to generate potential schedules for outbound agents. The push forward discrete modeler is operative to analyze the potential schedules to compute at least one of overstaffing and understaffing with respect to the potential schedules. Such representative embodiment results in, for example, higher productivity, less overtime, and better adjusting staffing to workload level. A representative method comprises: receiving information corresponding to historical call connect rates related to time intervals for which a schedule is to be generated; receiving information corresponding to scheduling constraints, the scheduling constraints comprising information corresponding to a desired service goal for the schedule, the desired service goal providing an indication of a level of service that is to be provided by the schedule; using the scheduling constraints to generate at least one potential schedules involving outbound agents, wherein the time intervals corresponding to higher historical call connect rates are weighted higher than others of the time intervals; and selecting a schedule from among the at least one potential schedules. Among others, the benefits of such method for scheduling outbound agents come from adjusting the manpower level to workload based on call connect rates, from better visibility of scheduling information, and from having time based schedule.

In an enhancement, the method may include the step of ranking the potential schedules and/or combining the outbound calling workload/schedule with an inbound calling workload/schedule for each period and staff requirements calculated for the combined work. Yet in another enhancement, the combined outbound and inbound schedule is evaluated based on an interchangeable unit, e.g., a common currency.

A representative computer-readable medium has a computer program stored thereon, with the computer program being executable on a computer to perform a computer-implemented method for scheduling outbound agents. In this regard, the method can comprise: receiving information corresponding to historical call connect rates related to time intervals for which a schedule is to be generated; receiving scheduling constraints, the scheduling constraints comprising information corresponding to: a maximum dial rate per schedule interval; agent handling times per right party connects and non-right party connects; and a desired service goal for the schedule, the desired service goal providing an indication of a level of service that is to be provided by the schedule; using the scheduling constraints to generate potential schedules involving outbound agents, wherein the time intervals corresponding to higher historical call connect rates are weighted higher than others of the time intervals; and selecting a schedule from among the potential schedules.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As will be described here with reference to several exemplary embodiments, systems and methods for scheduling outbound contact center agents are provided. As used herein, the term "outbound agent" is used to denote an agent that performs outgoing communications, and the term "inbound agent" is used to denote an agent that receives incoming communications. Notably, an agent can be a dedicated outbound agent (performing only outbound communications), a dedicated inbound agent (receiving only incoming communications), or can be a mixed inbound/outbound agent. Thus, in some embodiments, these varying uses of agents can be considered during scheduling. In this regard, potential agent schedules are analyzed and estimated service levels are generated, thereby allowing a suitable schedule to be selected.

With respect to the scheduling of agents for handling an outbound queue, there are several factors that may be considered. These may include, but are not limited to: the ability to trade off against other outbound queues during skill-based scheduling; the ability to trade off against other media queues during multi-contact scheduling; the ability to consider the deferred nature of outbound work (scheduling agents at many different times of the day may all improve period service level); and the ability to weigh different scheduling intervals according to the Right Party Connect Rate (RPCR).

In this regard, the RPCR is the rate that an outbound agent connects with the person (the "right party") responsive to a corresponding phone number from a contact list being dialed. Notably, dialing of the phone numbers on a contact list typically is performed by a predictive dialer, which sequentially dials the numbers on the list and, responsive to determining that a connection has been made, directs the call to an outbound agent via an outbound queue.

Scheduling agents at time periods that have relatively high RPCR's may be desirable even if agents would contribute the same amount to the service goal at another time of the day. This is because many call lists have a designated maximum number of retries (additional attempts to dial a number from the list). By scheduling agents at higher RPCR time periods, a call list may be used at a more efficient rate. That is, if numbers on a contact list can only be dialed twice, dialing the numbers on the list during low RPCR time periods can cause the list to be used (this list is used once the numbers have been dialed twice) without obtaining an adequate number of RPC's. In contrast, by scheduling agents at lower RPCR time periods, a call list may be used too quickly (as dictated by the maximum number of retries). Thus, there may be an inability to create a schedule that meets the service goals. Notably, a service goal may be described as a predetermined number of Right Party Connects (RPC's) per call list, for example.

Other terms relating to connection rates include Connect Rate (CR) and Non-Party Connect Rate (Non PCR). The CR is the rate that an outbound agent connects with any person responsive to a phone number being dialed. The Non PCR is the rate that an outbound agent fails to connect with a person responsive to a phone number being dialed. Thus, the following relationship of these terms exists:

$$CR = RPCR + \text{Non } PCR$$

Other terms of particular relevance include:

Interval—an arbitrary time period, wherein a schedule is formed of sequential intervals.

Right Party Connect Rate per Interval (RPCR per interval)—the rate, during a particular interval, that an outbound agent connects with the person indicated on a contact list responsive to the corresponding phone number being dialed.

Right Party Connect Average Handle Time (RPC AHT)—the average amount of time that an agent spends responding to a call that is identified as an RPC.

Right Party Connect Average Handle Time per Interval (RPC AHT per interval)—the average amount of time, during a particular interval, that an agent spends responding to a call that is identified as an RPC.

Non-Right Party Connect Rate per Interval (Non-RPCR per interval)—the rate, during a particular interval, that an outbound agent fails to connect with a person responsive to a phone number being dialed.

Non-Right Party Connect Average Handle Time (Non-RPC AHT)—the average amount of time that an agent spends responding to a call that is identified as a Non-RPC.

Non-Right Party Connect Average Handle Time per Interval (Non-RPC AHT per interval)—the average amount of time, during a particular interval, that an agent spends responding to a call that is identified as a Non-RPC.

Figure 1:
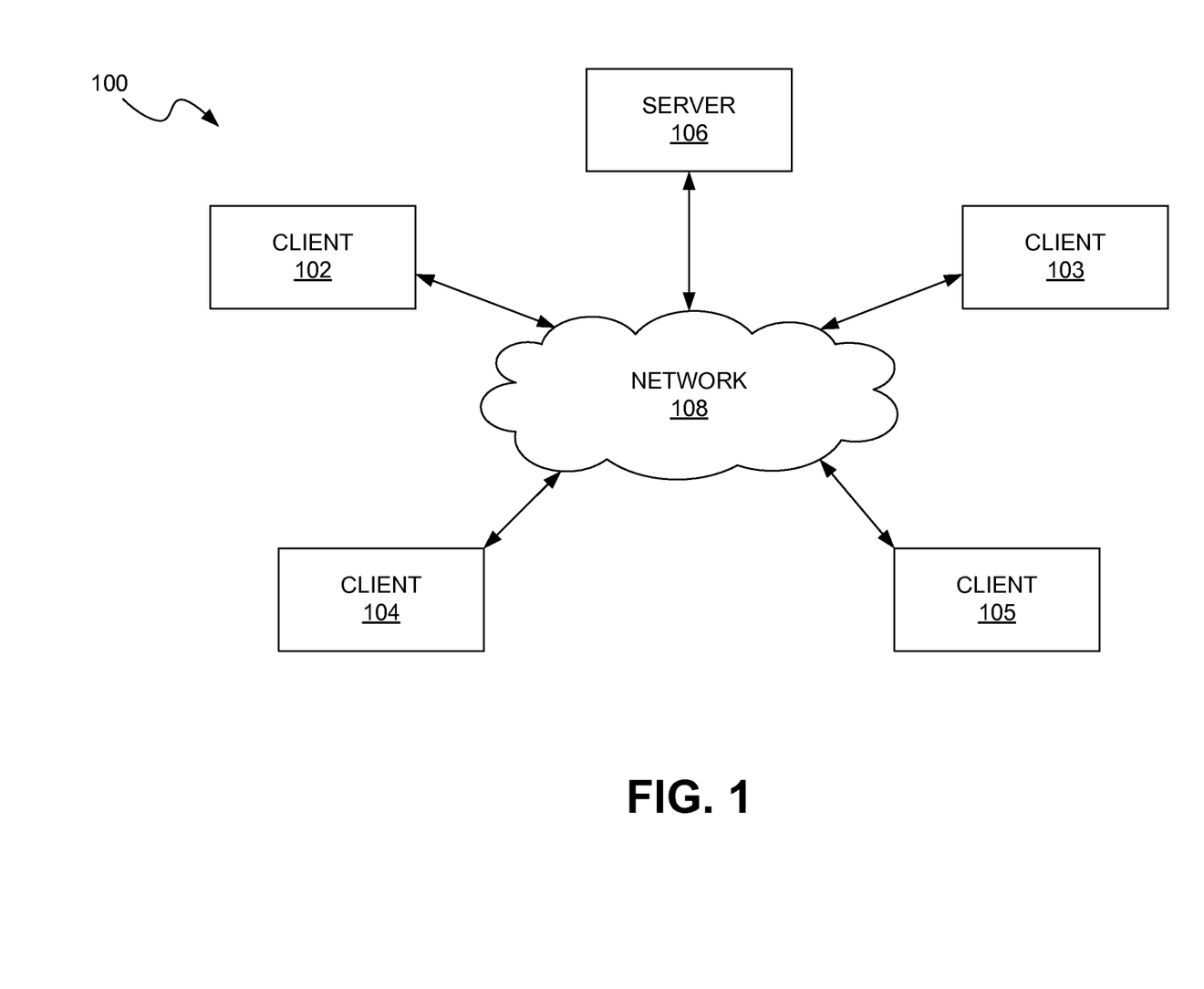
FIG. 1 is a schematic diagram illustrating an exemplary embodiment of a system for scheduling outbound agents.

Referring now to an exemplary system, FIG. 1 is an embodiment of a system 100 for scheduling inbound and outbound contact center agents. The system includes multiple client computers 102-105, which are coupled to a server 106 through a network 108. The network 108 can be any network, such as a local area network, a wide area network, or the Internet, and can comprise one or more of various communications media. The client computers each include one or more processors and one or more storage devices. Each of the client computers also includes a display device, and one or more input devices. The server 106 includes one or more storage devices. All of the storage devices store various data and software programs.

In at least one embodiment, methods for scheduling inbound and outbound contact center agents are carried out on the system 100 by instructions executing on one or more of the client computers 102-105. The instructions may be stored on the server 106 or on any of the client computers. For example, one embodiment is a hosted application used by a call center of an enterprise that requires scheduling of inbound and outbound agents. The instructions are stored on the server and accessed through the network by a client computer operated by the enterprise. In other embodiments, the instructions may be stored and executed on the client computer.

Data required for the execution of the instructions can be entered by a user of the client computer through a user interface. Data required for the execution of the instructions can also be accessed via the network and can be stored on the network.

Figure 2:
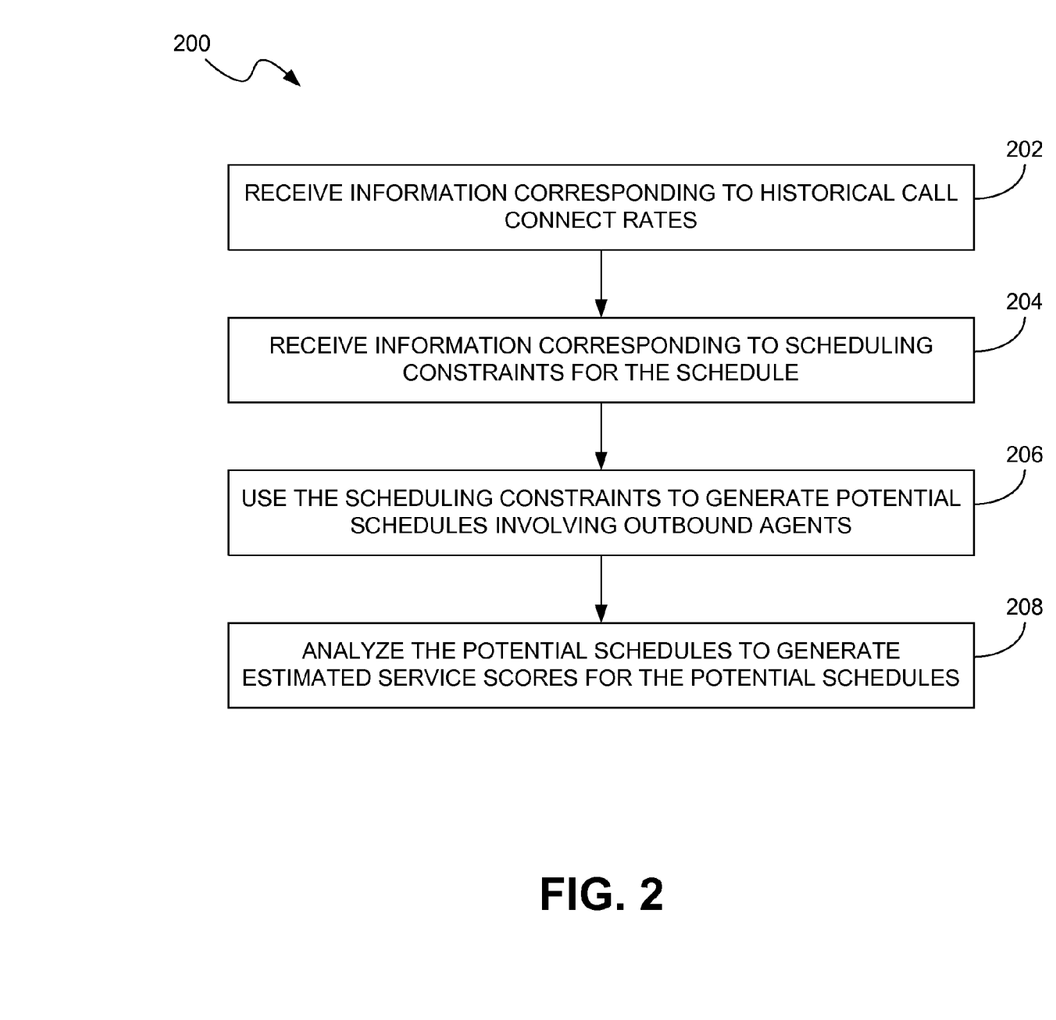
FIG. 2 is a flowchart illustrating functionality (or method steps) that can be performed by an exemplary embodiment of a system for scheduling outbound agents.

As is described more fully below, a user who is performing scheduling can produce a schedule that most efficiently uses available agents across both inbound and outbound queues. In this regard, FIG. 2 is a simplified flow diagram of an embodiment of a method 200 for scheduling outbound agents. In this regard, the method may be construed as beginning at block 202, where information is received that corresponds to historical call connect rates related to time intervals for which a schedule is to be generated. By way of example, such information could include information pertaining to RPCR's during corresponding intervals of a prior year. In block 204, information corresponding to scheduling constraints, including information corresponding to a desired service goal for the schedule is received. For instance, a desired service goal may relate to a particular number of RPC's that should occur during the schedule. In block 206, the scheduling constraints are used to generate potential schedules involving outbound agents, wherein the time intervals corresponding to higher historical call connect rates are weighted higher than others of the time intervals. For example, for intervals that have RPCR's that are twice as high as other intervals, the intervals with the higher RPCR's could be weighted twice as high as the others (although direct correlation between the RPCR's and the weighting need not be used). Then, in block 208, the potential schedules are analyzed to generate estimated service scores for each of the potential schedules. Thus, by comparing the estimated service scores, the suitability of each of the schedules can be reviewed relative to each other and a desired schedule can be selected.

As mentioned above with respect to FIG. 2, information corresponding to historical call connect rates typically is required for performing scheduling of outbound agents. In particular, this information can include CR, RPCR, Connect AHT and RPC AHT, for example. Additionally, the lists of phone numbers that are to be dialed during a schedule should be forecast based on the same historical periods that are used to forecast RPC. Additionally, the arrival time of each list, the end time when a list becomes inactive, the amount of phone numbers on each list, and the amount of retries allowed per number could be used. Notably, some of these constitute scheduling constraints as mentioned above in FIG. 2.

As also mentioned above, information corresponding to a desired service goal for the schedule should be received. In this regard, a service goal could be a certain amount of RPC's. For example, a service goal could be an RPC of 10, or 10% of the phone numbers on a list are to achieve a right party connect before the list ends.

An example of schedule generation that can be performed by a system for scheduling inbound and outbound contact center agents will now be described in detail. In this example, various inputs are provided, such as via a user interface of the system. Specifically, information corresponding to a contact list that is to be used during the schedule is received. This information can include the list arrival time (e.g., Interval 1), the amount of phone numbers on the contact list (e.g., 1500), and the maximum number of retry attempts (e.g., 1). Additionally, the following forecasts (see Table 1.) are provided assuming that a schedule is to be generated for agents using the contact list during a four hour time period that is subdivided into four sequential 1-hour intervals.

TABLE 1

|  | Interval 1 | Interval 2 | Interval 3 | Interval 4 |
| --- | --- | --- | --- | --- |
| RPCR per interval | 2% | 5% | 5% | 1% |
| RPC AHT per interval | 200 sec | 200 sec | 200 sec | 200 sec |

TABLE 1-continued

|  | Interval 1 | Interval 2 | Interval 3 | Interval 4 |
| --- | --- | --- | --- | --- |
| Non RPCR per interval | 4% | 10% | 10% | 2% |
| Non RPC AHT per interval | 50 sec | 50 sec | 50 sec | 50 sec |

It should be noted that information regarding the maximum phone number dial rate per interval for this example is 1000 dials. This rate typically is established by the operating parameters of the predictive dialer that will be dialing the numbers from the contact list. Thus, in this case, the predictive dialer can dial, and route to an agent queue, 1000 calls per hour.

As an additional input, a service goal should be established. In this case, a goal of 100 RPC's is input. In this example, 100 RPC's equates to a right party connect for 7% of the numbers on the contact list (100 RPC's/1500 numbers).

From these inputs, some intermediate results can be derived. Specifically, Adjusted AHT given Non RPC's can be calculated. Adjusted AHT is given by the following equation, $$\text{Adjusted } AHT = RPC\ AHT + \text{ratio of Non } RPC \text{ to } RPC * \text{non } RPC.$$

Thus, in this example, Adjusted AHT=200+2/1*50 for each interval, resulting in an Adjusted AHT of 300 seconds for each of Intervals 1 through 4.

Given these values, schedules can be evaluated using full-time equivalents (FTE's). In this regard, an FTE is a fictional, dedicated, fully trained agent that does not need to be scheduled for breaks or training, for example. FTE's are used to evaluate potential schedules by allowing the computation of service goal scores for each of the potential schedules.

A service goal score is basically the divergence between the forecasted connects and the connects required to achieve the desired service goal. In some embodiments, a penalty can be imposed for some types of scheduling behavior, such as a schedule that includes handling calls during low RPCR intervals. In such an embodiment, the forecasted connects for the list are computed giving extra relative weight to connects made in high RPCR rate intervals. The forecasted and required connects are then normalized to be in terms of FTEs per interval. By providing results in terms of FTE's, common currency with other score terms is provided so that various schedules can be evaluated by direct comparison of results.

In order to compute a service goal score, a dialing plan is computed. In some embodiments, such a dialing plan can be created by pushing forward the list according to the FTEs and max dials per interval. Another embodiment would order the intervals by CR before pushing forward the lists. The RPC for each interval is then equal to the RPCR multiplied by the number of dials. Distributed connects and dials are continued until the end of the list is reached. If an RPC is made, it can be assumed that redialing of the number will not be performed.

An example of the above-mentioned computations is set forth below. In particular, potential schedules will be analyzed that involve 1 FTE scheduled during each interval and 5 FTE's scheduled during each interval. The results of using different numbers of FTE's can then be compared as will also be described below.

Continuing with the computations from above, dialing plans for the 1 FTE and 5 FTE schedules are as follows.

For 1 FTE, that FTE provides 3600 seconds of call handling time during each interval (i.e., each interval is one hour in duration). Since the Adjusted AHT is 300 seconds (per connect), 1 FTE should be able to attain 12 connects during Interval 1 (i.e., 3600 sec/300 sec per connect=12 connects).

Additionally, since the RPCR for Interval 1 is 2%, 12 connects/0.02 results in 600 dials being required to achieve the 12 connects during Interval 1.

For 1 FTE during Intervals 2 through 4, similar calculations result in the following: Interval 2, 12 connects using 240 dials; Interval 3, 12 connects using 240 dials; and Interval 4, 10 connects using 1000 dials. Note that Interval 4 is limited to the maximum dial rate of 1000, i.e., 12 connects would require more than 1000 dials during the interval, which is not permitted based on the previously received inputs.

For 5 FTE's, those FTE's provides 18000 seconds of call handling time during each interval (i.e., 5×3600 seconds). Since the Adjusted AHT is 300 seconds (per connect), 5 FTE's should be able to attain 60 connects during each interval (i.e., 18000 sec/300 sec per connect=60 connects). However, this schedule is limited to the maximum number of dials per interval, which is 1000 dials. Since this schedule is limited by dials, the number of connects is computed by multiplying the maximum number of dials by the RPCR for each interval. Thus, with respect to Interval 1, the number of connects is 20 (i.e., 1000 dials×0.02).

For 5 FTE's during Intervals 2 through 4, similar calculations result in the following: Interval 2, 50 connects using 1000 dials; Interval 3, 47 connects using 955 dials (note that 45 numbers have been reached on the first pass of the list and cannot be redialed, resulting in 955 dial instead of 1000 dials); and Interval 4, 0 connects (the maximum dials and retries has already been reached).

Given this connect plan and dialing plan, the forecasted service level can be computed. Specifically, with respect to the 1 FTE schedule, the forecasted service level is 46 RPC's (i.e., 12 connects+12 connects+12 connects+10 connects). With respect to the 5 FTE schedule, the forecasted service level is 117 RPC's (i.e., 20 connects+50 connects+47 connects+0 connects). Thus, in some embodiments, schedules can be compared and selected based on these outputs.

In other embodiments, a spike penalty can be imposed on the outputs to more readily indicate the deviations of the computed service levels from the service goals. This can by accomplished by using a simple score function, such as squaring the difference between a computed service level and its corresponding service goal. In the previous example of the 1 FTE schedule, such a scoring function would result in a score of 2916 (i.e., $(100-46)^2$).

Additionally or alternatively, some embodiments can be configured to give higher precedence to higher RPCR intervals. For instance, in the previous example, a goal of 100 RPC was set. Weighting values then can be assigned to each interval, such as by assigning the highest RPCR interval weight to be 2.0. Thus, intervals could be assigned the weights based on relative RPCR values such that a weight of 2.0, then 1.5, then 1.0 for the lowest RPCR intervals are assigned. In this case, the goal would be to gain 200 "weighted connects" (connects×the RPCR weight) and 0 additional connects beyond the connect goal.

Returning to the examples above, the 1 FTE schedule results in 76 weighted connects (i.e., 12 connects*2.0 weight+12*2.0+12*1.5+10*1.0=76). This corresponds to 124 weighted connects from the goal (i.e., 200−76=124).

The 5 FTE schedule results in 200 weighted connects (i.e., 50*2.0+50*2.0). However, in contrast to the understaffing scenario presented by the 1 FTE schedule (not enough connects were made), the 5 FTE schedule presents an overstaffing scenario. That is, there are 47 additional connects after the goal was met. In some embodiments, such overstaffing can be lower a score. For example, the 47 additional connects could be considered as a deviation from the goal that will count as overstaffing and lower the score.

Regardless of the particular method used for providing service level scores, at least some embodiments can normalize the service levels into FTEs per interval. In other words, a combined schedule may be evaluated based on a score that is interchangeable, e.g., common currency, between the inbound and outbound schedule. This potentially enables a schedule to trade off against other outbound, inbound and/or different media queues.

In some embodiments, this is accomplished by converting the connect score to FTE's by multiplying by AHT and dividing by the number of seconds per interval. Thus, with respect to the 1 FTE schedule, 124 Connects*300 AHT/3600 seconds=10.3 Under FTE's. With respect to the 5 FTE schedule, 47 Connects*300 AHT/3600 seconds=3.8 Over FTE's.

Next, the forecasted and required FTE's can be evenly distributed among the intervals. Thus, with respect to the 1 FTE schedule, 10.3 Required FTE's/4 intervals=2.6 additionally required FTE's for each of the 4 intervals. With respect to the 5 FTE schedule, 3.8 FTE's/4 intervals=0.95 fewer FTE's for each of the 4 intervals.

In some embodiments, a penalty can be added for any excess capacity that is not working on connects for each interval and the score can be adjusted with some spike penalty (clearly, in these examples, a lower score is a better schedule; however, a different methodology could be used). The excess capacity is equal to the FTE's in the interval minus the Connect workload divided by the interval length. Notably, these deltas/scores can trade off well against other outbound and different media queues.

With respect to the 1 FTE schedule, excess capacity during Interval 1=1 FTE−12 connects*300/3600=0. Similarly, excess capacity for Intervals 2 through 4 are 0, 0 and 0, respectively. With respect to the 5 FTE schedule, excess capacity during Interval 1=5−50 connects*300/3600=0.8. Similarly, excess capacity for Intervals 2 through 4 are 0.8, 2.9 and 5, respectively. Note that excess capacity is 5 in Interval 4 because no connects were made in that interval.

Therefore, calculation of a score that includes a spike penalty, could be accomplished as follows:

with respect to the 1 FTE schedule, $$\text{Score}=(2.6+0)^2+(2.6+0)^2+(2.6+0)^2+(2.6+0)^2=27.04$$

with respect to the 5 FTE schedule, $$\text{Score}=(3.8+0.8)^2+(3.8+0.8)^2+(3.8+2.9)^2+(3.8+5)^2=164.61$$

Since a lower score is considered closer to an optimal schedule, the 1 FTE schedule appears to be better suited for meeting the desired service goal.

Additionally, in the case of multi-skilled or mixed inbound/outbound agents, the outbound environment can be simulated in order to determine how multi-skilled agents distribute their time among their skills and to calculate the FTEs per interval.

Additionally, in the case where RPC information is not available, the same algorithm can be used to meet a Connect Goal via using CR instead of RPCR and Connect AHT instead of Adjusted RPC AHT.

A more detailed diagram depicting at least some of the functionality described above is presented in FIG. 3. In this regard, the outbound algorithm is implemented by a forward push discrete event modeler 300. The forward push discrete event modeler 300 receives a potential schedule from the search engine 302. The potential schedule includes capacity for every interval in the schedule period. The forward push discrete event modeler 300 also receives a service goal, RPCR, AHT and contact lists for the schedule period from an application 304, such as an integrated workforce optimization platform (described below).

Figure 3:
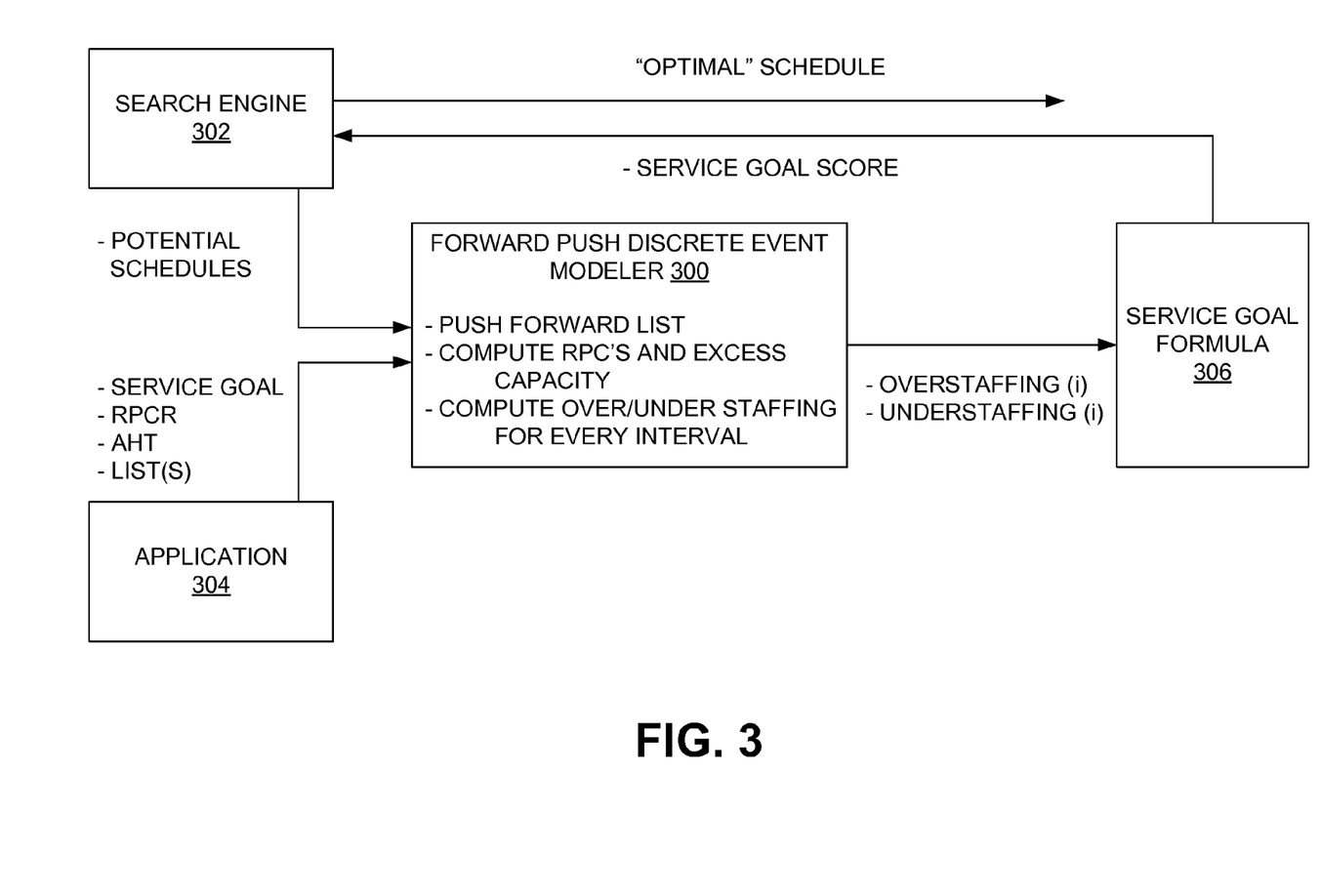
FIG. 3 is diagram illustrating operation of an embodiment of an outbound agent scheduling algorithm that can be performed by an exemplary embodiment of a system for scheduling outbound agents.

The forward push event modeler iterates to compute RPC's and excess capacity, and then computes overstaffing and understaffing for every interval. The service goal score formula 306 receives an understaffing/overstaffing result for every interval in the schedule period. The service goal score formula 306 generates a service goal score for every interval that is provided back to the search engine 302. The search engine analyzes the service goal scores and outputs an optimal schedule and an optimal dialing plan.

As mentioned above, integrated workforce optimization platforms provide inputs to forward push discrete event modeler 300. Additionally, integrated workforce optimization platforms can integrate other capabilities in support of a greater customer service strategy: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. These five segments can become part of an interwoven and interoperable solution, enabling contact centers to transition from reactive cost centers to proactive, information-rich departments that deliver strategic value to the organization. Workforce optimization is discussed in greater detail in the U.S. patent application entitled "Systems and Methods for Workforce Optimization," filed Feb. 22, 2006, and assigned Ser. No. 11/359,356, which is entirely incorporated herein by reference.

Figure 4:
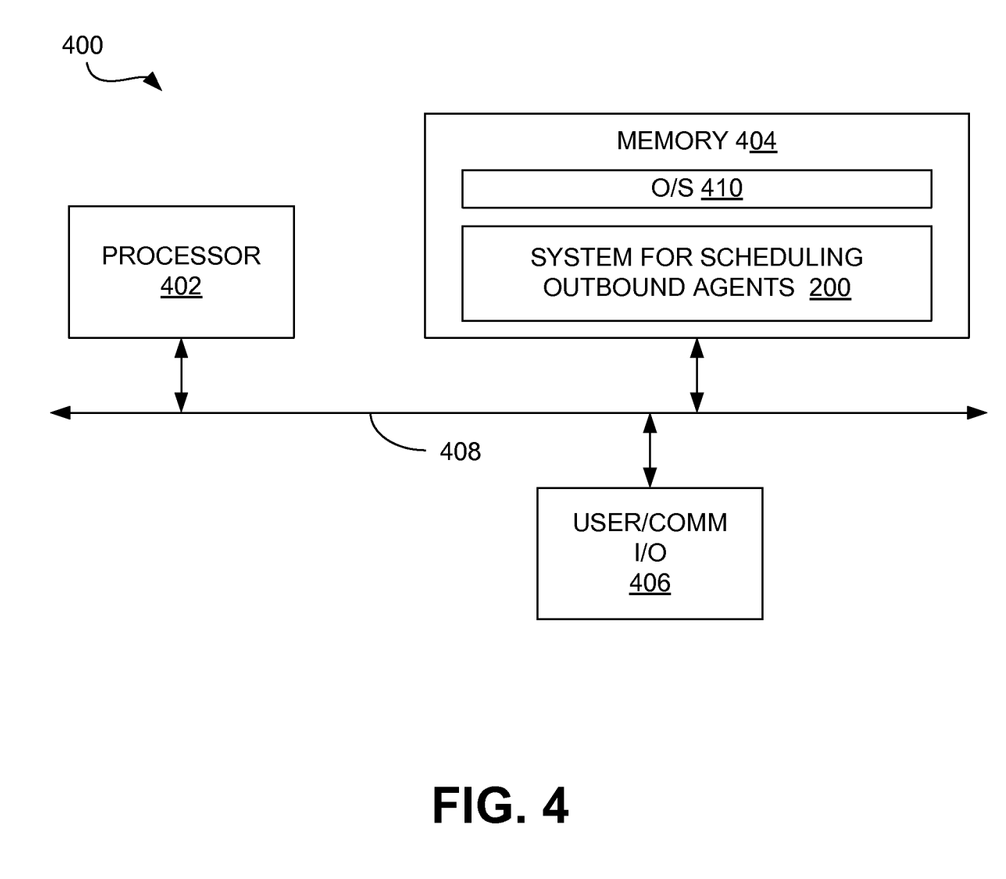
FIG. 4 is a schematic diagram illustrating an embodiment of a computer-implemented system that can be used for performing functionality, such as the functionality depicted in FIG. 2.

FIG. 4 is a schematic diagram illustrating an embodiment of a computer-implemented system that can be used for performing various functions associated with a system for scheduling outbound contact center agents. By way of example, the embodiment of FIG. 4 can be configured to perform the functionality depicted in FIG. 2. Generally, in terms of hardware architecture, system 400 includes a processor 402, a memory 404, and one or more user and/or communication (I/O) device interface(s) 406 that are communicatively coupled via a local interface 408. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor may be a hardware device for executing software, particularly software stored in memory.

The processor can be any custom made or commercially available processor, a central processing unit (CPU), an auxiliary processor among several processors associated with the recorder, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory (as well as various other components) can have a distributed architecture, where various components are situated remote from one another, but can be accessed by the processor 402. Additionally, memory 404 can also include an operating system 410, as well as instructions associated with various subsystems, such as a system for scheduling outbound agents 200.

The software in memory may include one or more separate programs, each of which includes an ordered listing of executable instructions for implementing logical functions. In this regard, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 can be configured to control the execution of other computer programs and provides scheduling, input-communication control, file and data management, memory management, and communication control and/or related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the system for scheduling outbound agents 200 is in operation, the processor is configured to execute software stored within the memory, to communicate data to and from the memory, and to generally control operations of the system pursuant to the software. Software in memory, in whole or in part, is read by the processor, perhaps buffered, and then executed.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" comprises any means capable of storing the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

What is claimed is:

1. A method of scheduling outbound agents, the method comprising:
   identifying a workload comprising a plurality of outbound contacts;
   receiving historical information comprising connection rates of past outgoing contact attempts;
   scheduling the outbound contacts based at least on the connection rates of the past outgoing contact attempts;
   scheduling the outbound agents based upon the scheduled outbound contacts into an outbound schedule; and
   combining the outbound schedule with an inbound schedule, resulting in a combined outbound and inbound schedule.

2. The method of claim 1 wherein scheduling the outbound contacts based at least on the connection rates of the past outgoing contact attempts comprises assigning the outbound agents to the workload to handle the outbound contacts.

3. The method of claim 1 wherein the connection rates of the past outgoing contact attempts are provided for a plurality of time periods.

4. The method of claim 3 wherein the connection rates of the past outgoing contact attempts describe rates at which the past outgoing contact attempts were successfully connected for each of the time periods.

5. The method of claim 4 wherein scheduling the outbound contacts based at least on the connection rates of the past outgoing contact attempts comprises scheduling the outbound contacts during the tune periods having higher likelihoods of successful connection based on the connection rates of the past outgoing contact attempts.

6. The method of claim 1 wherein the plurality of outbound contacts comprises outgoing telephone calls.

7. The method of claim 1 wherein the plurality of outbound contacts comprises web chat sessions.

8. One or more non-transitory computer-readable storage media having stored thereon program instructions for scheduling outbound agents, wherein the program instructions, when executed by a computer system, direct the computer system to:
   identify a workload comprising a plurality of outbound contacts;
   receive historical information comprising connection rates of past outgoing contact attempts;
   schedule the outbound contacts based at least on the connection rates of the past outgoing contact attempts;
   schedule the outbound agents based upon the scheduled outbound contacts into an outbound schedule; and
   combine the outbound schedule with an inbound schedule, resulting in a combined outbound and inbound schedule.

9. The one or more non-transitory computer-readable storage media of claim 8 wherein the program instructions, in order to direct the computer system to schedule the outbound contacts based at least on the connection rates of the past outgoing contact attempts, direct the computer system to assign the outbound agents to the workload to handle the outbound contacts.

10. The one or more non-transitory computer-readable storage media of claim 8 wherein the connection rates of the past outgoing contact attempts are provided for a plurality of time periods.

11. The one or more non-transitory computer-readable storage media of claim 10 wherein the connection rates of the past outgoing contact attempts describe rates at which the past outgoing contact attempts were successfully connected for each of the time periods.

12. The one or more non-transitory computer-readable storage media of claim 11 wherein the program instructions, in order to direct the computer system to schedule the outbound contacts based at least on the connection rates of the past outgoing contact attempts, direct the computer system to schedule the outbound contacts during the time periods having higher likelihoods of successful connection based on the connection rates of the past outgoing contact attempts.

13. The one or more non-transitory computer-readable storage media of claim 8 wherein the plurality of outbound contacts comprises outgoing telephone calls.

14. The one or more non-transitory computer-readable storage media of claim 8 wherein the plurality of outbound contacts comprises web chat sessions.

15. A system for scheduling outbound agents, the system comprising:
   an instruction execution system configured to identify a workload comprising a plurality of outbound contacts, receive historical information comprising connection rates of past outgoing contact attempts, schedule the outbound contacts based at least on the connection rates of the past outgoing contact attempts, and schedule the outbound agents based upon the scheduled outbound contacts into an outbound schedule, and combine the outbound schedule with an inbound schedule, resulting in a combined outbound and inbound schedule.

16. The system of claim 15 wherein the instruction execution system configured to schedule the outbound contacts based at least on the connection rates of the past outgoing contact attempts comprises the instruction execution system configured to assign the outbound agents to the workload to handle the outbound contacts.

17. The system of claim 15 wherein the connection rates of the past outgoing contact attempts are provided for a plurality of time periods.

18. The system of claim 17 wherein the connection rates of the past outgoing contact attempts describe rates at which the past outgoing contact attempts were successfully connected for each of the time periods.

19. The system of claim 18 wherein instruction execution system configured to schedule the outbound contacts based at least on the connection rates of the past outgoing contact attempts comprises the instruction execution system configured to schedule the outbound contacts during the time periods having higher likelihoods of successful connection based on the connection rates of the past outgoing contact attempts.

20. The system of claim 15 wherein the plurality of outbound contacts comprises outgoing telephone calls.

\* \* \* \* \*